(12) United States Patent
DeMatteis

(10) Patent No.: US 6,171,226 B1
(45) Date of Patent: Jan. 9, 2001

(54) PLASTIC BAG BUNDLING SYSTEM

(75) Inventor: Robert B. DeMatteis, Grass Valley, CA (US)

(73) Assignee: Bob DeMatteis Co., Grass Valley, CA (US)

( * ) Notice: Under 35 U.S.C. 154(b), the term of this patent shall be extended for 0 days.

(21) Appl. No.: 09/258,010

(22) Filed: Feb. 25, 1999

Related U.S. Application Data

(60) Provisional application No. 60/092,233, filed on Jul. 9, 1998, provisional application No. 60/092,232, filed on Jul. 9, 1998, provisional application No. 60/089,583, filed on Jun. 17, 1998, provisional application No. 60/089,582, filed on Jun. 17, 1998, provisional application No. 60/088,613, filed on Jun. 9, 1998, and provisional application No. 60/088,612, filed on Jun. 9, 1998.

(51) Int. Cl.⁷ ........................................................ B37B 1/14
(52) U.S. Cl. .......................... 493/227; 493/230; 493/233; 493/226
(58) Field of Search ................................. 206/554, 806; 383/9; 53/384.1, 570, 571; 493/226, 227, 230, 233, 238

(56) References Cited

U.S. PATENT DOCUMENTS

| Re. 33,264 | 7/1990 | Baxley . |
|---|---|---|
| Re. 34,324 | 7/1993 | Haenni . |
| D. 287,572 | 1/1987 | Dancy . |
| D. 288,779 | 3/1987 | Pilon . |
| D. 307,555 | 5/1990 | Haenni . |
| D. 308,170 | 5/1990 | Wilfong . |
| D. 323,619 | 2/1992 | Wilfong . |
| D. 325,311 | 4/1992 | Mygind . |
| D. 396,636 | 8/1998 | Wilfong . |
| 4,480,750 | 11/1984 | Dancy . |
| 4,529,090 | 7/1985 | Pilon . |
| 4,676,378 | 6/1987 | Baxley . |
| 4,696,403 | 9/1987 | Hoover . |
| 4,759,639 | * 7/1988 | DeMatteis ........................... 383/9 |
| 4,786,275 | 11/1988 | Hoover . |
| 4,793,539 | 12/1988 | Haenni . |
| 4,807,754 | 2/1989 | Rowe . |
| 4,819,899 | 4/1989 | Weil . |
| 4,849,090 | 7/1989 | Case . |
| 4,872,766 | 10/1989 | Dancy . |
| 4,911,560 | 3/1990 | Hoover . |
| 4,923,436 | 5/1990 | Gelbard . |
| 4,925,512 | 5/1990 | Briand . |
| 4,930,385 | 6/1990 | Wilfong . |
| 4,953,664 | 9/1990 | Vrooman . |
| 4,981,216 | 1/1991 | Wilfong . |
| 4,995,860 | 2/1991 | Wilfong . |

(List continued on next page.)

Primary Examiner—Eugene Kim
(74) Attorney, Agent, or Firm—Townsend and Townsend and Crew LLP

(57) ABSTRACT

A process of serially dispensing and opening a bag from a bundle of bags includes providing a bundle of bags having at least a leading bag and a plurality of trailing bags. Tabs at the top of the bags fasten to a support and sever under a first force. A fastening adjacent the top of the rear bag wall of a leading bag joins to the top of the front bag wall of a trailing bag, this fastening severing under a second force. Pulling on the front bag wall of the leading bag to sever the front support tab of the leading bag from the support; continued pulling on the front bag wall of the leading bag severs the rear support tab of the leading bag. The front support tab of the trailing bag from the support is also severed. The rear support tab of the leading bag pulls on the front support tab of the trailing bag to sever both the rear support tab of the leading bag and the front support tab of the trailing bag from the support. Further continuing pulling on the front bag wall of the leading bag causes severing of the first force of the front support tab of the trailing bag. Thereafter, the second force fastening the rear bag wall of the leading bag to the front bag wall of the trailing bag is exceeded. This second force causes separation of the leading bag from the trailing bag in a bag open disposition.

7 Claims, 8 Drawing Sheets

U.S. PATENT DOCUMENTS

| | | |
|---|---|---|
| 5,020,750 | 6/1991 | Vrooman . |
| 5,125,604 | 6/1992 | Vrooman . |
| 5,188,235 * | 2/1993 | Pierce et al. .......................... 206/554 |
| 5,207,328 * | 5/1993 | Bose et al. ............................ 206/554 |
| 5,207,367 | 5/1993 | Dunn . |
| 5,207,368 | 5/1993 | Wilfong . |
| 5,335,788 | 8/1994 | Beasley . |
| 5,362,152 | 11/1994 | Fletcher . |
| 5,561,967 * | 10/1996 | Nguyen ................................ 206/554 |
| 5,562,580 | 10/1996 | Beasley . |
| 5,667,173 | 9/1997 | Wilfong . |
| 5,845,779 | 12/1998 | Wilfong . |
| 5,881,882 | 3/1999 | Fletcher . |
| 5,938,033 * | 8/1999 | Huang et al. ........................ 206/554 |
| 5,941,393 * | 8/1999 | Wilfong, Jr. ......................... 206/554 |
| 5,996,801 * | 12/1999 | Tsu ....................................... 206/554 |

* cited by examiner

PLASTIC BAG BUNDLING SYSTEM

CROSS-REFERENCES TO RELATED APPLICATIONS

This application claims priority from Provisional Patent Application 60/088,613 filed Jun. 9, 1998 by the named inventor herein entitled Plastic Film Hinging patent application Ser. No. 09/257,345 filed Feb. 25, 1999 of even date herewith entitled Plastic Film Hinging and Precreasing Process is likewise incorporated by reference as if fully set forth herein.

This application claims priority from Provisional Patent Application entitled Cold Sealing of Plastic Film 60/088,612 filed Jun. 9, 1998 by the named inventor herein. Patent application Ser. No. 09/257,848 filed Feb. 25, 1999 of even date herewith entitled Apparatus and Process for Cold Seal in Plastic Bags is likewise incorporated by reference as if fully set forth herein.

This application claims priority from Provisional Patent Application 60/089,582 filed Jun. 17, 1998 by the named inventor herein entitled Plastic Bag Bundling System.

This application claims priority from Provisional Patent Application 60/089,583 filed Jun. 17, 1998 by the named inventor herein with Don Pansier of Greenbay Wis. entitled Automatic Ventilating System. Patent application Ser. No. 09/258,033 filed Feb. 25, 1999 of even date herewith entitled Automatic Ventilating System is likewise incorporated by reference as if fully set forth herein.

This application claims priority from Provisional Patent Application 60/092,232 filed Jul. 9, 1998 entitled Plastic Bag Manufacturing Process by the named inventor herein. Patent application Ser. No. 09/257,361 filed Feb. 25, 1999 of even date herewith entitled Plastic Bag Manufacturing Process is likewise incorporated by reference as if fully set forth herein.

Finally, this application claims priority from Provisional Patent Application 60/092,233 filed Jul. 9, 1998 entitled Plastic Film Rigidity Means by the named inventor herein. Patent application Ser. No. 09/258,015 filed Feb. 25, 1999 of even date herewith entitled Plastic Film Rigidity Means is likewise incorporated by reference as if fully set forth herein.

The above Provisional Applications and all following Regular Patent Applications filed of even date herewith—and all of them—are herein incorporated by reference as if fully set forth herein.

This invention relates to plastic bag and film products that may be used for a multitude of purposes such as, but not limited to, fast foods, supermarkets, retail merchandise and point-of-purchase bags.

More specifically, this invention relates to the ways in which these bags are bundled together into bag packs and then dispensed in their respective systems.

BACKGROUND OF THE INVENTION

Common plastic bag styles used by retailers in fast food chains, supermarkets, and general merchandise, as well as in point-of-purchase applications usually have an open bag mouth at the top and are of the bottom seal variety, which are gusseted along their sides, or of the sideweld variety, which are gusseted along the bottom. Many of these common bags have carrying handles, most of which are of the strap variety or die-cut holes near the bag top. Typical plastic bags used in supermarket applications are about 0.0005 to 0.00065 in gauge; those used in retail merchandise bags are from 0.0005 to 0.0001; fast food bags are usually from 0.0007 to 0.00125, and; those used in point of purchase applications are typically from 0.001 to 0.004 mil thick. Many of these bags are typically stacked up in the manufacturing process and are then bonded into bag packs of 50 to 100 bags which are then packed into shipping cartons. It is desirable to have them in bag packs for handling purposes as is well known in the art. The bundled bags with their detachable tabs or severable apertures are then usually put onto racks and holders for easy dispensing. It is also desirable to have plastic bags self-open as is also well known in the art.

As described in U.S. Pat. No. 4,676,378 Baxley, et al., adhesives may be used to cause plastic bags to self-open when dispensed from their T-shirt rack holders, such as the rack in my U.S. Pat. No. 4,821,985. As described in U.S. Pat. No. 5,183,158, Boyd and U.S. Pat. No. 5,562,580, Beasley, et al., cold seals may selectively cause the self-opening of the next bag in sequence. The key to using cold seal processes for selectively bonding bags in a bag pack is revealed in my U.S. Pat. No. 5,013,290, which discusses having an inside bag surface with low coefficient of friction and an outside surface with a high coefficient of friction, thereby selectively bonding the high coefficient surfaces together. As distinguished from the disclosure that follows, this patent relies upon a fused wicket and flaps having the high/friction and low/friction interfaces.

Beasley, et al. in U.S. Pat. No. 5,335,788 illustrate the use of cold seals when applied to the top regions of plastic bags which cold seals may also be used to bond the plastic grocery sacks together in bag packs.

It is well known that these common plastic grocery sacks when manufactured are stacked up, die cut, and bonded into bag packs of 50 bags or more bags. The bags and their respective die-cut detachable tabs may be heat sealed together forming the bag pack. A form of heat-sealing merchandise bag tabs together is also revealed in my U.S. Pat. No. 4,759,639 commonly known as Dual-Tab® bags. Furthermore, some bag packs have been formed by using wire twist ties to bundle them together by securing the twist tie through the die cut bag handles that are aligned one atop the other. The bag handles can then be mounted onto a handle holder. U.S. Pat. No. 4,241,561, Suominen, reveals one of these types of handle holders. In U.S. Pat. No. 5,667,173 Wilfong, et al., reveal a similar compact rack for T-shirt bags.

Having a bag system and a means of bundling, self-opening, and using plastic bags on racks, holders and hooks is desirable—especially if the method of bundling and self-opening enhances the handling of bags and can be made cost-effectively.

SUMMARY OF THE INVENTION

A process of serially dispensing and opening a bag from a bundle of bags includes providing a bundle of bags having at least a leading bag and a plurality of trailing bags. Each bag of the bundle of bags has a front bag wall with a top, a bottom, and two parallel side edges; a rear bag wall with a top, a bottom, and two parallel side edges. The bags further include two bag sides, each bag side joining one of the side edges of the front bag wall to one of the side edges of the rear bag wall to form a closed continuum around the front bag wall and the rear bag wall. A sealed bottom joins the bottom of the front bag wall and the bottom of the rear bag wall to form a closed bottom to the closed continuum of the bag. The support of the bag to at least one support is provided by at least one front support tab fastened to the front bag wall. The front support tab has a front support aperture for severance from a support through the front support aperture under a first force. At least one rear support tab is fastened to the support at the rear bag wall. The rear support tab has a rear support aperture for severance from a support through the rear support aperture under the first force. A fastening adjacent the top of the rear bag wall of a leading bag joins to the top of the front bag wall of a trailing bag, this fastening severing under a second force. Pulling on the front bag wall of the leading bag to sever the front support tab of the leading bag from the support; continued pulling on the front bag wall of the leading bag severs the rear support tab of the leading bag. The front support tab of the trailing bag from the support is also severed. The rear support tab of the leading bag pulls on the front support tab of the trailing bag to sever both the rear support tab of the leading bag and the front support tab of the trailing bag from the support. Further continuing pulling on the front bag wall of the leading bag causes severing of the first force of the front support tab of the trailing bag. Thereafter, the second force fastening the rear bag wall of the leading bag to the front bag wall of the trailing bag is exceeds the second force. This second force attaches the rear bag wall of the leading bag to front bag wall of the trailing bag to cause separation of the leading bag from the trailing bag in a bag open disposition.

The present invention refers to several simple—yet related—means of using adhesives or cold seals and a die-cutting operation to bundle plastic bags into bag packs and thereby improve the handling of the bag packs. It also includes using this adhesive or cold sealing process to cause the bags in their bag packs to self-open when they are dispensed from their bag packs and respective holders.

One of the key elements of the present invention is the use of cold sealing or adhesively sealing extended portions above the bag mouth or extended flanges in a die cut handle to bond bags together into bag packs, instead of using heat sealed tabs or cold sealing portions of the bag body. The advantages are many. First, when the extended portions above the bag mouth are apertured, it then easy for a user to locate and mount them onto a hook. This extended portion, when releasably bonded together, also creates a superior self-opening means then it does when placed in a bag body. Part of the reason for this is due to the superior leverage point it has. Pulling a weak bond near a bag mouth makes it easier to pull the front bag wall open and apart from its rear wall, thereby opening the bag mouth, as it is to pull from a leverage point anywhere below the bag mouth, such as the upper bag body region. The thin bag walls in the body region typically resist opening due to the fact that there is no air inside the walls allowing them to easily separate. When bonding flanges at the handle region such as those in my U.S. Pat. No. 5,338,118 the flanges perform four functions: one, strengthen the die-cut handle; two, soften the handle for the end user; three, bond the bags together into a bag pack and; four, causing it to self-open when placed on the appropriate handle hook when dispensed. Since the flange is also near the cut-out edge of the die cut handle, it has a similar superior self-opening leverage as being near the bag mouth.

The present invention also illustrates a particular aperture/holder or aperture/hook relationship that when used in a variety of bag packs—including all those herein and prior art—create an improved system of dispensing and self-opening of the bags in bag packs.

The present invention also reveals a form of aperture that serves three purposes. The three purposes are: 1) a means of mounting a bag pack on a retaining hook; 2) a means of releasably bonding the bag pack together, and; 3) a means of enabling easy severance of a bag from the bag pack.

The bags of the present invention can be made on existing bag machinery and produced at high speeds with minor modifications. For ease of explanation, only a few particular forms of the present invention will be revealed herein, however, it would be easy for anyone trained in the art to find other related applications, which would fall under the scope of the present invention.

DESCRIPTION OF THE SPECIFIC EMBODIMENTS

Figure 1:
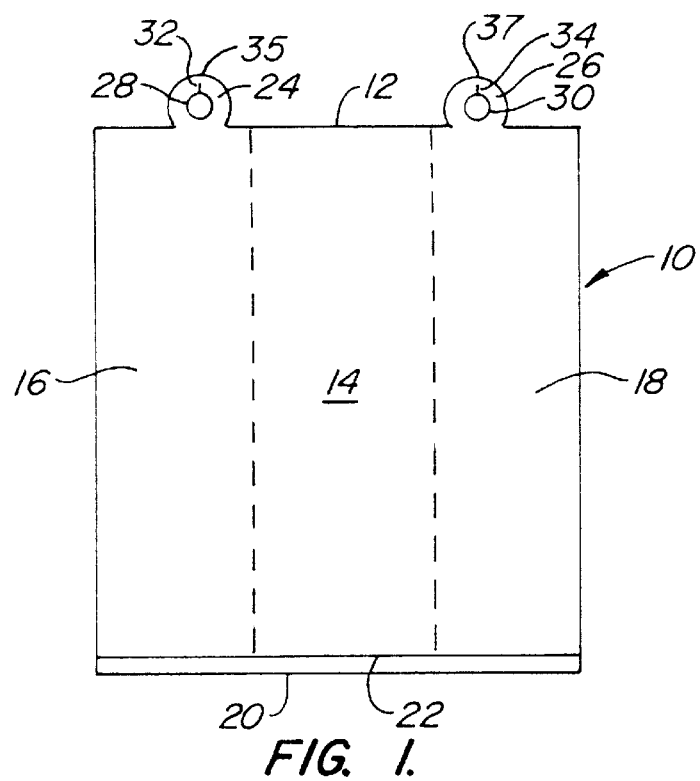
FIG. 1 is a plan view of a bag of the present invention with severable extended portions above the bag mouth.

In FIG. 1 bag 10 has an openable bag mouth 12 at the top, a front wall 14, and a rear wall (not shown), two opposing side gussets 16 and 18 and a bottom 20 formed by lateral bottom seal 22. Above bag mouth 12 are two severable extended portions 24 and 26, which portions have apertures 28 and 30 respectively so that the two extended portions may be mounted onto retaining hooks (not shown). Apertures 28 and 30 are pre-weakened by slits 32 and 34 respectively which enable the extended portions 24 and 26 to sever when dispensed from the retaining hooks. Slits 32 and 34 are shown as being cut from the edge of apertures 28 and 30 respectively up to a point about 1/16" inside the top outer edges 35 and 37 of the extended portions 24 and 26 respectively.

Figure 2:
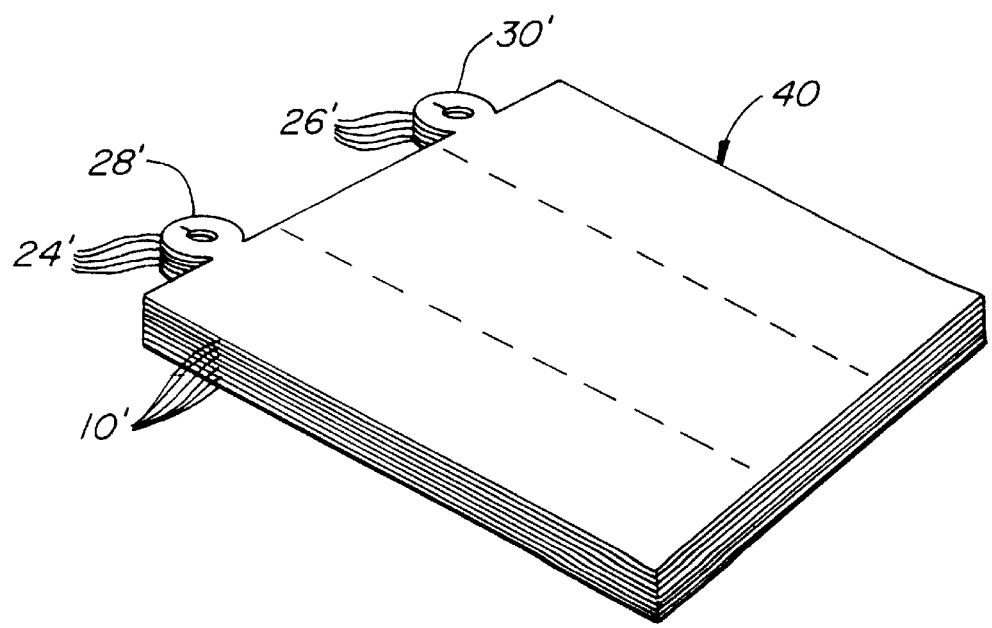
FIG. 2 is a perspective view of the bag in FIG. 1 in which the bags are held together in a bag pack by releasable bonds on their severable extended portions.

In FIG. 2, the bag 10 in FIG. 1 is shown as part of a stacked bag pack 40 in which all the bags 10' in the pack are identical to bag 10 in FIG. 1. In bag pack 40 all the severable extended portions 24' and 26' are in alignment, which severable portions are selectively bonded together by releasable bonds made by any of the many well-known methods of applying self-opening cold seals or adhesives. Also in alignment are apertures 28' and 30' for easy mounting onto retaining hooks.

Figure 3:
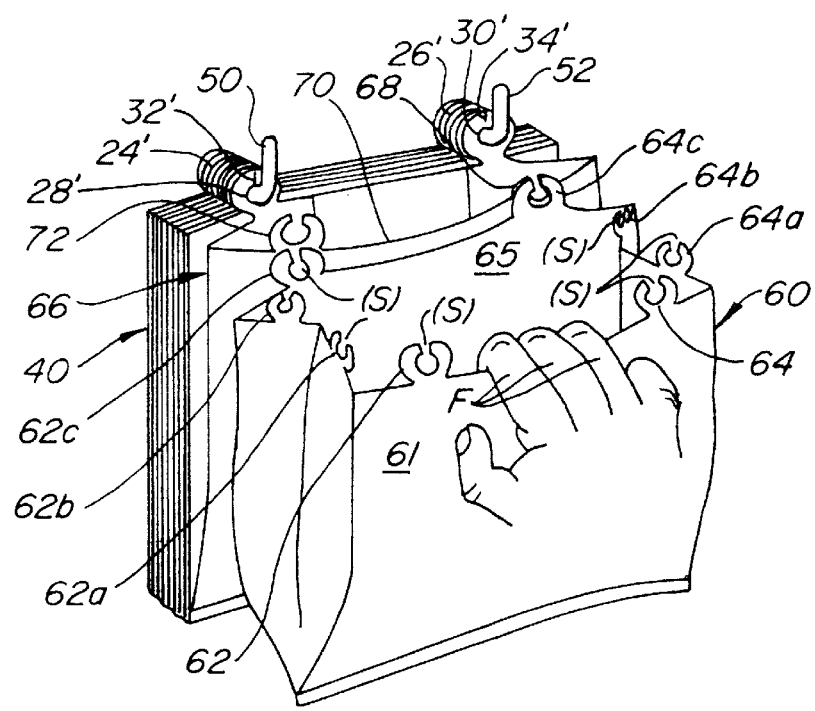
FIG. 3 is a perspective view of the bag pack in FIG. 2, which bag pack is mounted onto retaining hooks in which the forward-most bag is being dispensed and self-opening the next bag in sequence.

In FIG. 3 the bag pack 40 of FIG. 2 is mounted onto retaining hooks 50 and 52 by threading the apertures 28' and 30' of extended portions 24' and 26' respectively onto hooks 50 and 52. A user's fingers F have pulled the front wall 61 of forward-most bag 60 forward thereby forcing the severance of its extended portions 62 and 64 of bag wall 61 from retaining hooks 50 and 52 respectively. In this pulling/dispensing operation, the subsequent extended portions 62a, 62b, 62c and 64a, 64b, 64c have also been severed (s). This severance (s) occurs because the releasable bond between the extended portions is greater than the resistance of the respective pre-weakened slits (such as those slits 32' and 34', which are still in tact on hooks 50 and 52).

Assuming that the bundle is placed on hooks 50–52, the serial dispensing can be analyzed. User's fingers F are shown grabbing front wall 61 of bag 60. Pulling of the front bag wall 61 of bag 60 has occurred until that bag 60 is separated at extended portions 62, 62a, 62b, and 62c from hook 50 and extended portions 64, 64a, 64b, and 64c from hook 52.

It will be clear that direct tension transmitted through the front bag wall will sever extended portions 62, 62a, 62b, and 62c on one bag side and extended portions 64, 64a, 64b, and 64c on the other bag side. This severance will serially occur with tension transmitted through the bag material from the front panel to the respective extended portions. This accounts for the separation of bag 60 at its extended portions.

It will further be noted that extended portions 62c and 64c are a special case. These respective extended portions are fastened to extended portions 72 and 68 of trailing bag 66. Again, because of the direct transmission of tension from fingers F through bag walls of bag 60, extended portions 72 and 68 of front bag wall 70 will be severed from respective hooks 50, 52. This accounts for the perspective view of FIG. 3.

Fingers F will continue to pull on front panel 61 of bag 60. At this time, severance of bag 60 from bag pack 40 will occur. This will occur because of the sum of two forces holding bag 66 to the bundle 40. The forces are the severance force required for extended portions 72a and 68a and the attachment of extended portions 72 to 72a and extended portions 68 to 68a.

Contrast this with bag 60. It will be seen that only one force is present holding bags 60 and 66 together. This force is the attachment between extended portions 62c and 64c on bag 60 to respective extended portions 72 and 68 on bag 66.

Fingers F continue to pull on front bag panel 61. There is no alternative but that bag 60 separate from bag 66 at the bond between extended portions 62c and 64c on bag 60 and extended portions 72 and 68 on bag 66. The illustrated serial dispensing occurs.

Referring to FIG. 3, and stated in other terms, extended portion 64c of the rear wall 65 of the forward-most bag 60 is shown as being still bonded to the next bag in sequence 66 at its front bag wall extended portion 68, and self-opening the front wall 70 of bag 66. Extended portion 62c of rear wall 65 of forward-most bag 60 has already caused the extended portion 72 of the front wall of the next bag in sequence 66 to sever from hook 50 and then, due to the resistance of the weight of bag 66, and that bag 66 is also being back in bag pack 40 by its remaining bonds at its remaining extended portions, 62c has thereby released its bond entirely with extended portion 72. Once extended portion 64c releases itself from extended portion 68, forward-most bag 60 will be entirely free from the bag pack 40 and ready for use by the user. The next bag in sequence 66 will then have its front wall 70 open and ready for future dispensing by the user.

This same means of using severable and releasably bonded extended portions may also be applied inside the side gussets of bags, whereas they are releasably bonded at the front and rear bag walls only. This same means of using severable and releasably bonded extended portions may also be applied to flat, non-gusseted bags with the same self-opening effect as illustrated in this FIG. 3. In the embodiments that follow, two forces are used to have the serial dispensing of bag from a bundle with the dispensed bag generally moved to the open position. The first force is that required to generally separate and singulate the bag from its supports. The second force is the separation of the leading bag at the rear bag wall from the trailing bag at the front bag wall at a position adjacent the support tab of the bag. When a bag is dispensed, the trailing bag is held to the bag bundle by the first force and the second force while the leading bag is dispensed from the bundle by overcoming the second force alone.

Figure 4:
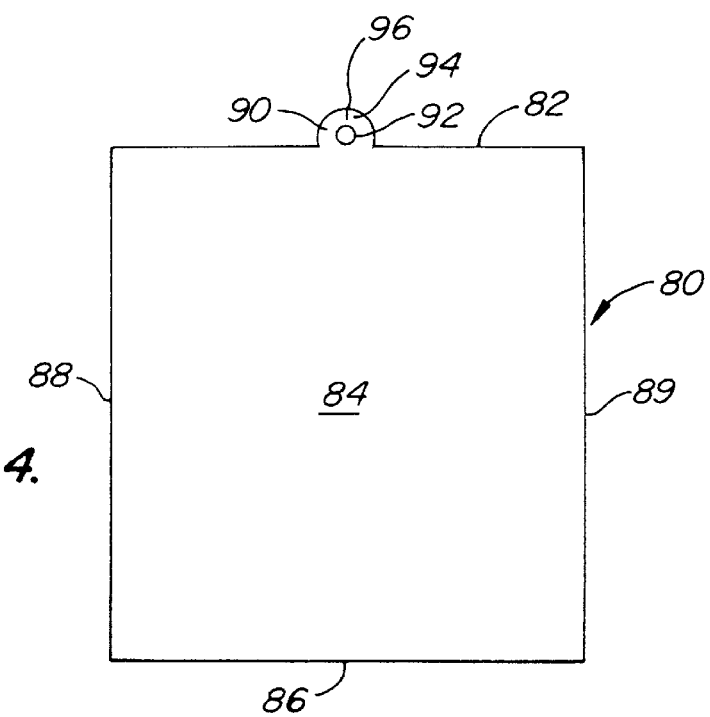
FIG. 4 is a plan view of a variation of the bag in FIG. 1 and the bag pack in FIGS. 2 and 3, which bag and bag pack have only a single severable extended portion.

In FIG. 4, sideweld bag 80 has an openable bag mouth 82 at the top, a front wall 84, a rear wall (not shown), a bottom 86, and a left side and a right side formed by sideweld edges 88 and 89 respectively. Above bag mouth 82 is a single severable extended portion 90, which portion has an aperture 92, which aperture may be mounted onto a single retaining hook, much like one of the size used in FIG. 3. Above aperture 92 is a pre-weakened slit 94, which enables the extended portion to sever when dispensed from a retaining hook. Dispensing of this bag in its bag pack is much the same as illustrated in FIG. 3 as it uses the same principles of releasably bonding the extended portions to hold the bag pack together, which portions are mounted onto a hook, thus enabling a user to dispense the bags and thereby self-open the next bag in sequence. Note that the pre-weakened slit 94 is not connected to aperture 92, but is cut about 1/32" above aperture 92 and about 1/32" inside the outside edge 96 of extended portion 90. This form of a pre-weakened slit works equally as well as slits 32 and 34 of FIG. 1.

Figure 5:
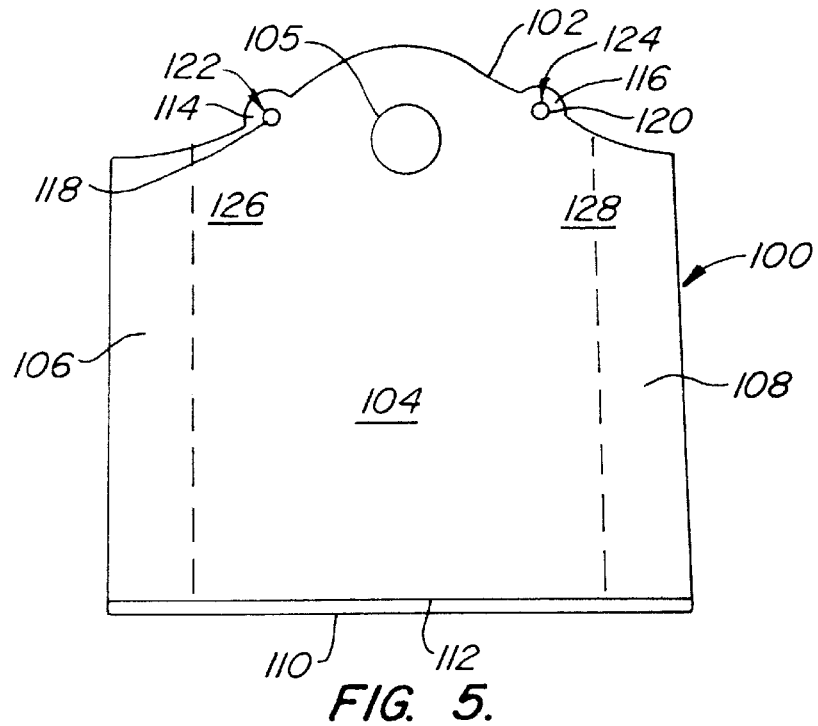
FIG. 5 is a plan view of a variation on a bag pack with severable extended portions, which bags dispense and self-open in much the same manner as the bag in FIG. 1 and the bag pack in FIGS. 2 and 3.

In FIG. 5, bag 100 has an openable bag mouth 102 at the top, a front wall 104 a rear wall (not shown), a die cut handle 105 which is cut through front wall 104 and the rear wall, two opposing side gussets 106 and 108 and a bottom 110 formed by lateral bottom seal 112. Above bag mouth 102 are two severable extended portions 114 and 116, and adjacent these extended portions and below the bag mouth are apertures 118 and 120, which apertures and extended portions may be mounted onto retaining hooks (not shown). Apertures 118 and 120 are pre-weakened by slits 122 and 124 respectively which enable the extended portions 114 and 116 to sever when dispensed from retaining hooks. In this illustration, the cut-out operation that forms the two extended portions 114 and 116 is also forming the outer sloping shoulder regions 126 and 128 of bag 100. Dispensing of this bag when releasably bonded together into a bag pack is much the same as that illustrated in FIG. 3 as it too uses the same principles previously discussed. As illustrated, by having the two extended portions above the bag mouth and their two respective apertures adjacent the bag mouth, the result of dispensing bags from a bag pack is virtually identical to those bags and bag packs aforementioned in FIGS. 1, 2, 3 and 4.

Figure 6:
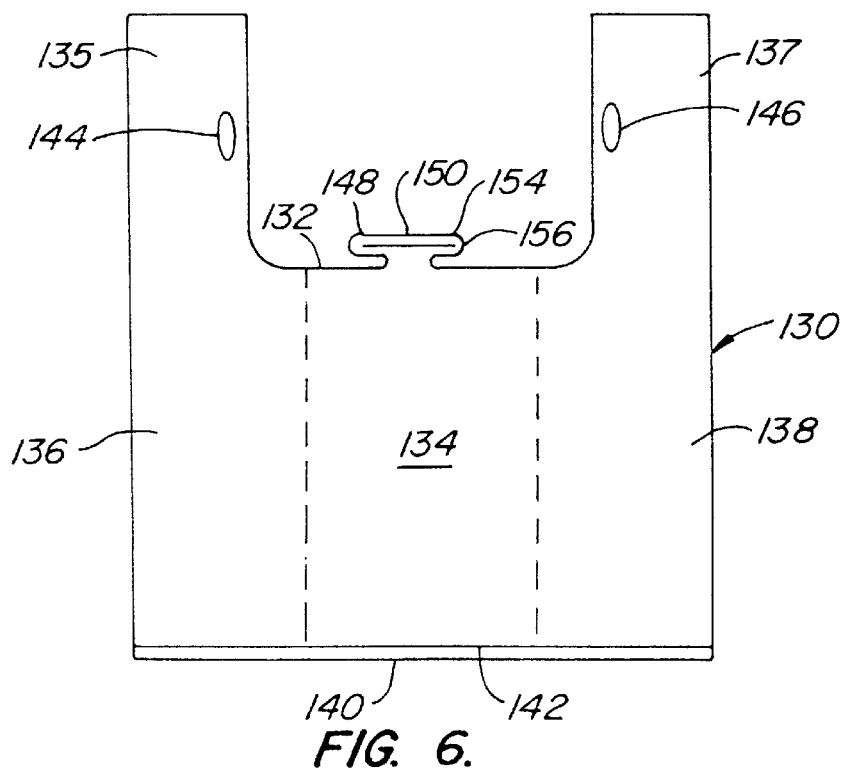
FIG. 6 is a plan view of the present invention as it may be applied to a plastic grocery sack.

In FIG. 6, plastic grocery sack 130 has an openable bag mouth 132, a front wall 134 a rear wall (not shown), two opposing handles 135 and 137 which are cut through front wall 134 and the rear wall and the two opposing side gussets 136 and 138 respectively, and a bottom 140 formed by lateral bottom seal 142. Handles 135 and 137 have apertures 144 and 146 for mounting onto the support rods of a common, rack style holder (not shown) as referenced in the Description of Prior Art. Above bag mouth 132 is severable extended portion 148, which portion has a slit-like aperture 150, which aperture is cut with its right side end 154 being about 1/32" from the outside edge 156. The aperture 150 in the extended portion 148 is mounted onto the retaining hook of the previously referenced common, rack style holder. In the severable extended portion 148 of grocery sack style bag 130, aperture 150 also serves as its own pre-weakened slit by being placed close to the outside edge of the extended portion. This form of slit in an extended portion may also be applied to all of the preceding examples and may also be applied below the bag mouth. This grocery sack design when releasably bonded together into its bag pack and then mounted on its corresponding rack style holder also dispenses and self-opens in virtually the exact same method as the previous bag packs described.

Figure 7:
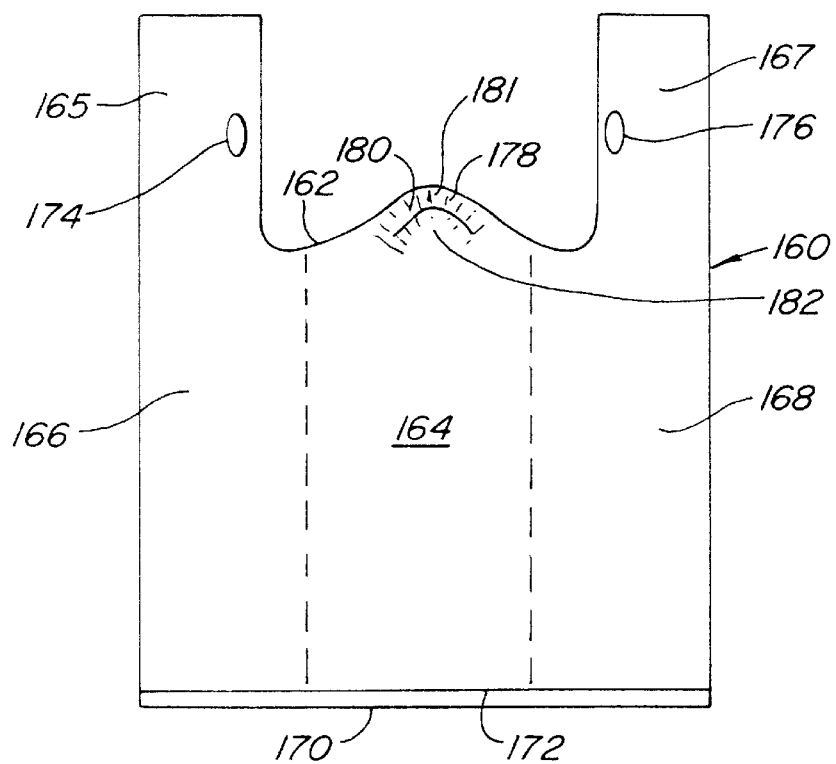
FIG. 7 is a plan view of a variation of the present invention as it may be applied to a plastic grocery sack.

In FIG. 7 plastic grocery sack 160 has an openable bag mouth 162, a front wall 164 a rear wall (not shown), two opposing handles 165 and 167 which are cut through front wall 164 and the rear wall, and the two opposing side gussets 166 and 168 respectively, and a bottom 170 formed by lateral bottom seal 172. Handles 165 and 167 have apertures 174 and 176 for mounting onto the support rods of a common, rack style holder (not shown) as referenced in the Description of Prior Art. In the upper, central portion of bag wall 164 adjacent bag mouth 162 is severable portion 178, which portion generally lies above the outer regions of bag mouth 162, and which portion has a slit-like aperture 180 and a pre-weakened slit 181 (much like any of those previously described). The aperture 180 in severable portion 178 is mounted onto the retaining hook of the previously referenced common, rack style holder. About severable portion 178 of grocery sack style bag 160 an adhesive 182 (shown by cross-hatched shading) is applied to the outer surface of bag wall 164, which adhesive serves to releasably bond the front wall of the illustrated bag to the back wall of the bag in front of it. In a stacked bag pack the adhesive would then releasably bond each successive bag to the next one in sequence. This grocery sack design when in its bag pack and mounted on its corresponding rack style holder also dispenses and self-opens in virtually the exact some method as the previous bag packs described. It should be noted that whether or not the bags and bag packs disclosed herein use an adhesive or a cold seal, the result is the same: a bag pack that is releasably bonded together and when dispensed, the bags self-open, one after another.

Figure 8:
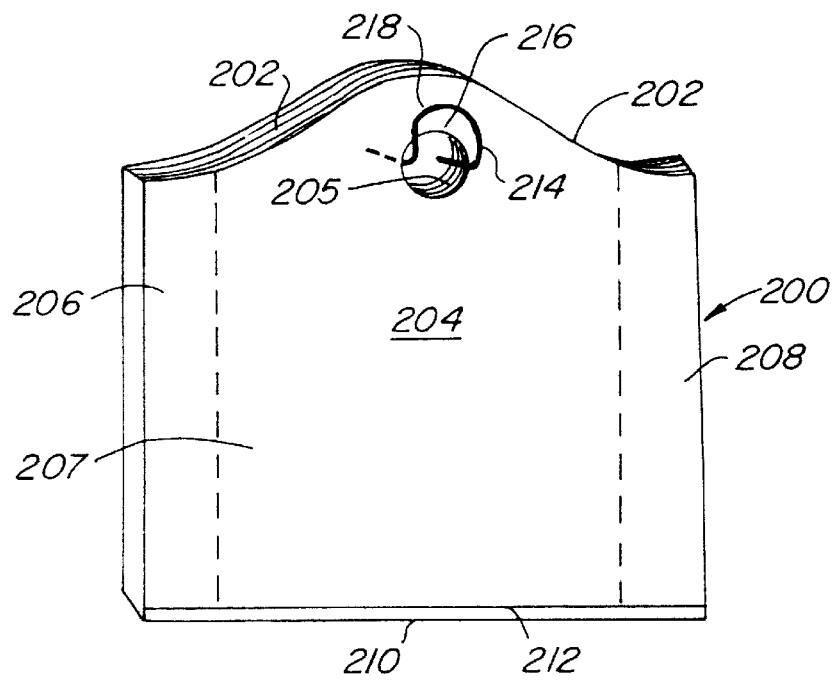
FIG. 8 is a perspective view of a releasably bonded bag pack with die cut handles mounted on a handle holder.

In FIG. 8, bag pack 200 has openable bag mouths 202 aligned at the top, die cut handles 205 which are cut through all of the front walls (only 204 of forward-most bag 207 is shown) and the rear walls (not shown) are aligned, two opposing side gusset groups 206 and 208 are aligned with bag bottoms 210 aligned at the bottom (bottom seal 212 of the forward-most bag is illustrated). Aligned bag mouths 202 are created by a die-cutting operation, which die-cutting operation has releasably bonded together the bag mouths 202 at their cut edges, or immediately adjacent the cut edges. These bag mouths 10 will selectively cause the bags in the bag pack to self-open much like all of the preceding bag examples because the outside surfaces of the front and rear bag walls have been made with a high coefficient of friction while the inside surfaces have a low coefficient of friction. This difference in coefficient of friction may be the result of using corona treatment, the use of co-extruded films with layers that have a different coefficient of friction, or by applying a weak, diluted adhesive. This releasable bond at the bag mouth does not have to be great since the leverage of selectively self-opening the next bag in sequence is best when the bonds are either at or adjacent the bag mouths themselves. Various die blades may create different bonding effects based upon being serrated, or having their edges blunted as known by those experienced in the art. The key to creating a bonding effect between the bag surfaces with the high coefficient of friction is by the amount of pressure being applied in the die cut operation to the film area proximate the bag mouth. Aligned handles 205 are mounted onto wire handle holder 214. Wire handle holder 214 is of a design in which the upper "U-shaped" portion 218 of holder 214 rises sufficiently above the top edge 216 of aligned handles 205 so that the bag pack is adequately retained and bags will not fall off. The preferred embodiment of wire holder 214 would have this top portion 218 of holder 214 extend about 1 to 1¼" above handle top edges 216, which reason is illustrated in the following FIG. 9.

Figure 9:
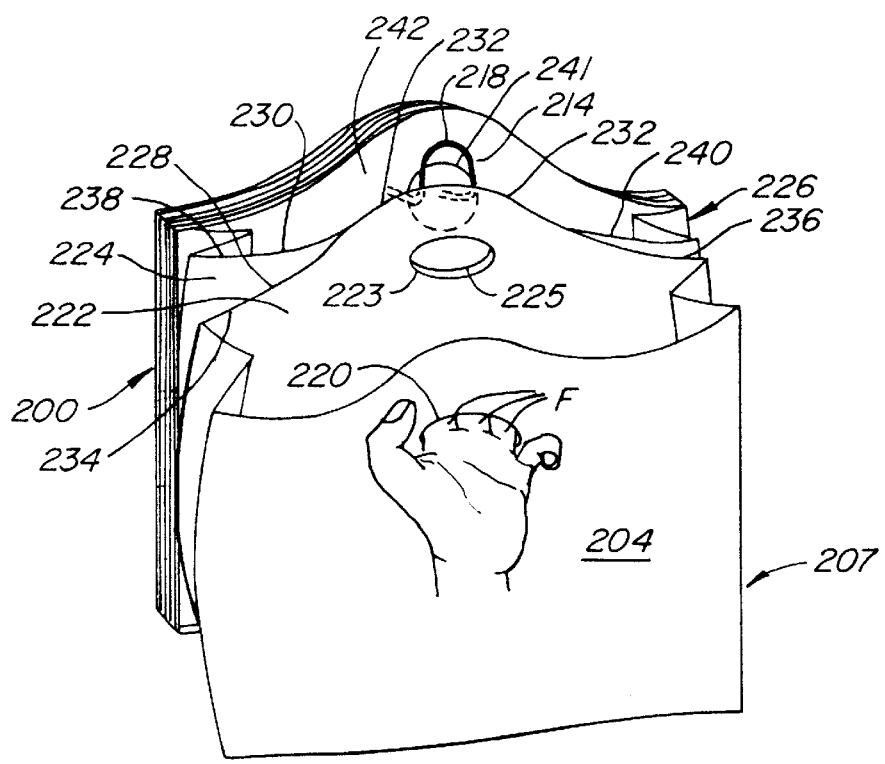
FIG. 9 is a perspective view of the bag pack in FIG. 8 illustrating how a user can easily dispense the bags in the bag pack and self-open the next bag in sequence.

In FIG. 9, the user's three middle fingers F have grasped the die cut handle hole 220 on front wall 204 of forward-most bag 207 and has pulled the bag slightly upwards and forward in which the rear wall 222 and its die cut handle hole 223 have slid up and over the top portion 218 of U-shaped handle holder 214. When the rear bag wall 222 and handle hole 223 are slid up and over the top portion 218 of holder 214, the front wall 224 and its die cut handle hole 225 of the next bag in sequence 226 also slides up and over the top portion 218 of holder 214. This happens because bag 226 has been releasably bonded to bag 207 at their respective bag mouth edges. This bonding is illustrated as the bag mouth edge 228 of forward-most bag 207 is still bonded to bag mouth edge 230 of the next bag in sequence 226 at the central bag mouth location 232. At outer bag mouth locations 234 and 236 of bag mouth 228 and the respective outer bag mouth locations 238 and 240 of bag mouth 230 the bag mouth bonds have broken. This is because when the user continues to pull forward-most bag 207 forward, the next bag in sequence 226 is retained on holder 218 at die cut handle hole 241 of bag rear bag wall 242. Thus, the next bag in sequence 226 then becomes the forward-most bag with its front bag wall 224 free from holder 214 and ready for grasping at handle hole 225 which is also free from holder 214, which handle hole is now ready for the subsequent dispensing. This simple methodology of mounting releasably bonded die cut handle bag packs onto a handle hook and retaining the pack and the next bag in sequence as the forward-most bag is pulled free from the holder and bag pack can be accomplished with any number of related bonding means. For instance, instead of bonding the bags and the pack at the bag mouth region, the bond may be by cold pressure seals in the upper bag region as described in U.S. Pat. No. 5,335,788, or; by cold seals in extended portions similar to those described in FIGS. 1 through 8, but without the apertures, or; by applying adhesives to any portion or extensions of the bags in the pack, or; by cold sealing at the die cut handle.

Figure 10:
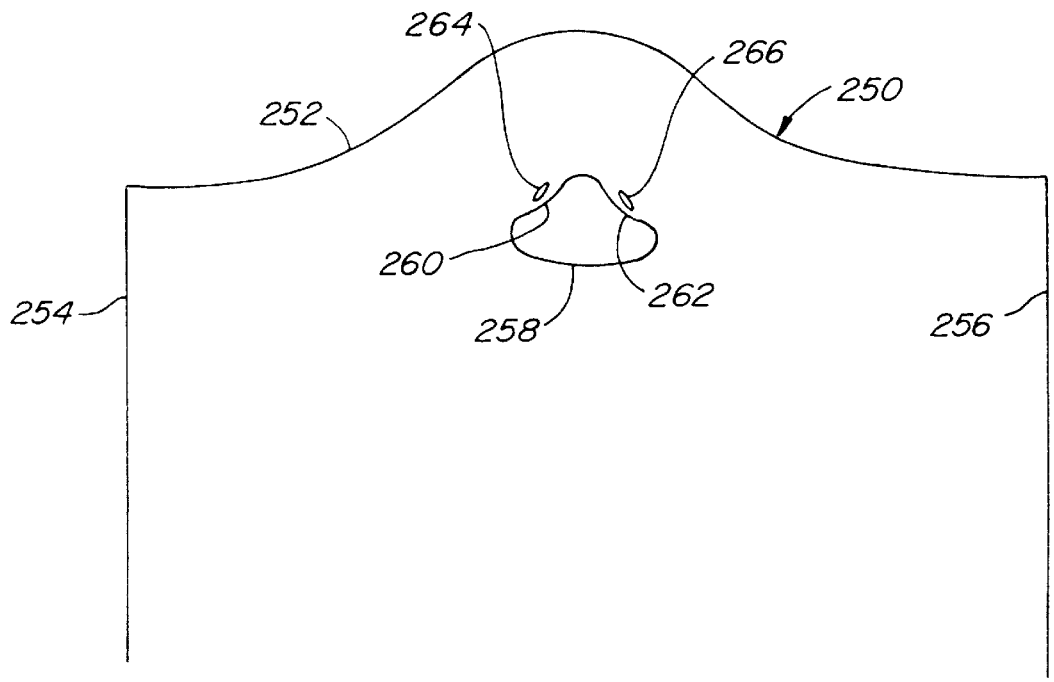
FIG. 10 is a partial plan view of a bag pack, which illustrates releasably bonding the bag together at the flange extensions in the die cut handle.

In FIG. 10, bag pack 250 has openable bag mouths 252 aligned at the top, left sides 254 aligned at the left, right sides 256 aligned at the right and bottoms (not shown) which are also aligned. Below bag mouths 252 are the aligned die cut handles holes 258, which are designed according to my U.S. Pat. No. 5,338,118, which die cut handles have two finger compression flanges 260 and 262, which flanges extend downward into the die cut handle's cut-out and are also aligned. In flange 260 is cold seal 264 and in flange 262 is cold seal 266, which seals serve to releasably bond the bags in the bag pack together via the cold sealing methods previous described. Thus they are ready to be mounted onto a handle holder such as that of FIGS. 8 and 9 and be dispensed in the same manner as the bags of FIG. 9.

Figure 11:
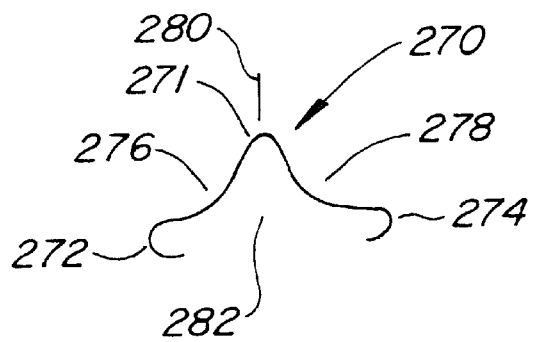
FIG. 11 is a plan view of a non-binding, severable aperture suitable for mounting onto horizontal U-shaped retaining hooks.

In FIG. 11 aperture 270 has a top 271, a left side 272, a right side 274, an inwardly extending flange 276 on the left side and an inwardly extending flange 278 on the right side. Above top 271 is pre-weakened slit 280, which typically would be cut about 1/16" away from the top edge 271 to allow for easy severance. Pre-weakened slit 280 may also be situated about 1/16" below a bag mouth (not shown) or an extended portion (not shown). In the center of the aperture is film portion 282. The ends of sides 272 and 274 are curved back upon themselves and point inward at a direction that will help relieve the possibility of tearing the thin plastic film. This form of aperture can be used as the central releasable portion for common grocery sacks, on extended portions as previously described, or can be used in any number of bag film or sheet applications in which severability of the bag or sheet film is desirable instead of the use of a detachable tabs. This particular aperture may also be used as the releasable bonding means of a bag pack if it is made according to the inventive matter revealed in the following FIGS. 13, 14, 15 or 16.

Figure 12:
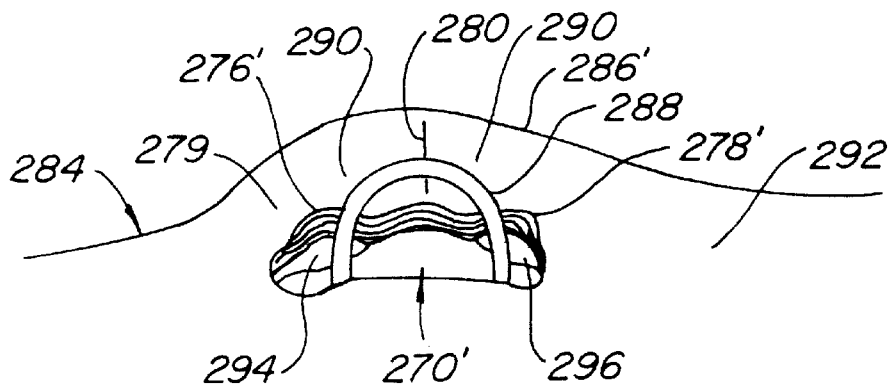
FIG. 12 is a perspective view illustrating how the aperture in FIG. 11 avoids binding on a horizontal U-shaped retaining hook.

In FIG. 12 aligned apertures 270' in bag pack 284 is like aperture 270 revealed in FIG. 11 and is located near the aligned bag mouths 286', which bag pack 284 is mounted onto a horizontally positioned U-shaped retaining hook 288. When mounted on retaining hook 288, the shape of aligned apertures 270' causes the inwardly extending flanges 276' and 278' to turn upwards so that all the aligned, forward-facing surfaces (only forward-facing surface 279 of forward-most bag 292 is shown) on the bag walls of the bags in bag pack 284 do not come into direct contact with the retaining hook 288. Thus, when the forward-most bag 292 is dispensed from retaining hook 288 as previously discussed, the forward-facing bag wall surfaces (such as that of surface 279) of bag pack 284 will not bind on the retaining hook and will separate easily at the pre-weakened slit 280. As shown, the turning up of the inwardly extending flanges 276 and 278 have caused the rear-facing walls 294 and 296 to rest against retaining hook 288. On a narrower retaining hook, this type of aperture may instead cause the inner edges 293 and 295 of aperture flanges 276' and 278' to come in contact with the retaining hook (such as a narrow version of hook 288) which produces substantially the same result. Center film portion 282 (not shown) has been tucked downward in order to illustrate this non-binding phenomena.

Figure 13:
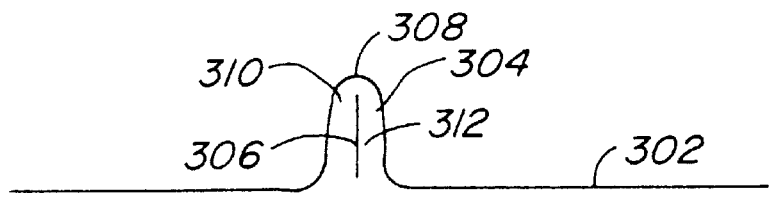
FIG. 13 is a plan view of a bag pack in which the severable extended portion contains a releasably bonded slit-like aperture.

In FIG. 13 bag pack 300 has aligned bag mouths 302, aligned upwardly extended portions 304, wherein there are aligned pre-weakened slit apertures 306 which are cut up to a point about 1/16" below extended portion tops 308, aligned left sides 310 and aligned right sides 312. The aligned pre-weakened slits on the bags of bag pack 300 may be made by using a relatively wide die blade (for instance a 6-pt. thickness) in the die cutting operation, and when cutting through aligned bag pack 300 the cut may cause the successive bags to selectively and releasably bond together much like the bag mouths of bag pack 200 in FIG. 8 have bonded together. Or, when used on a bag pack, other means of releasably bonding the bags together in a bag pack may also be used.

Figure 14:
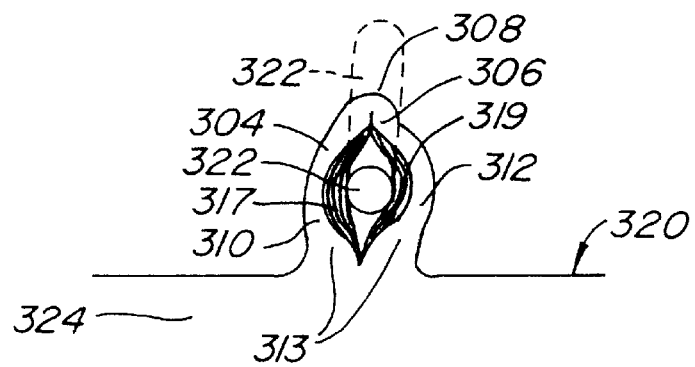
FIG. 14 is a perspective view illustrating how the aperture in FIG. 13 avoids binding on a retaining hook.

In FIG. 14 the aligned extended portions 304 are shown as part of an aligned bag pack, 320 which bag pack is mounted onto a horizontally positioned hook 322, which is shown in part by dotted lines in order to illustrate the inventive matter more clearly. When bag pack 320 is mounted on retaining hook 322, the shape of slit apertures 304 causes the left side 310 and the right side 312 to turn outwards so that all the aligned, forward-facing extended portion surfaces (only forward-facing surface 313 of the front wall 315 of forward-most bag 324 is shown) of the aligned bags in bag pack 320 do not come into contact with the retaining hook 322. Instead, the inner edges 317 and 319 of the aligned aperture/slits or the rear facing walls of the extended portions (not shown) press up against hook 322 forming the second force. Thus, when the forward-most bag 324 is dispensed from retaining hook 322 the forward-facing surfaces (such as surface 313 of the front wall) of the bag walls in the bags in bag pack 320 will not bind on the retaining hook 322 and will separate easily at the top of extended portion 308 above pre-weakened slit 306. By using this form of slit/aperture on a narrower retainer hook, the turning up of the aperture sides 310 and 312 may also cause the rear-facing walls (not shown) to rest against the narrower hook, which produces substantially the same result. This aperture can also be utilized effectively below a bag mouth with substantially the same results.

Figure 15:
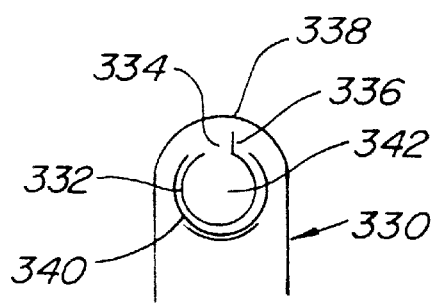
FIG. 15 is a plan view of aligned extended portions in which a die punch is used to create a slit-like aperture with the inside portion still connected, which also resists binding on retaining hooks.

In FIG. 15 extended portions 330 have aligned apertures 332 which remain connected at location 334 and which apertures have aligned ends 336 which lie about 1/16" from the top 338 of extended portions 330 thereby causing a pre-weakened point. These apertures 332 are made by a die punch with an external bevel, which bevel has formed a circular compression area 340 (shade lines) outside apertures 332, which compression area runs through the entire stack of bags and thereby releasably bonding the extended portions 330 together throughout the bag pack with the second force. Inside of apertures 332 are center portions 342, which when placed over a retaining hook like the one in FIG. 14 flip upwards and prevents the forward-facing surfaces of the extended portions in the bags in the bag pack to press up against and bind on the retaining hook. In other words, it functions much like the slit/apertures revealed in FIGS. 11, 12, 13 and 14 and dispenses in much the same manner as the bag packs previously discussed. The compression that is created by using outside beveled punches can also be created by using an inside beveled punch, with the compressed area being in center portions 342 instead. The result is substantially the same.

Figure 16:
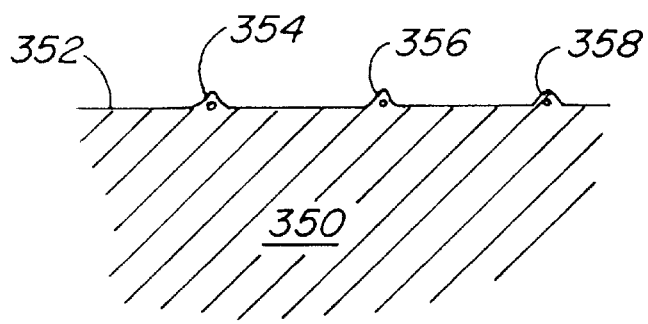
FIG. 16 is a partial view of the aligned bag mouths of a bag pack, which illustrates the releasable bonding of several small upwardly pointing tits located just above the bag mouth, which bonding of tits hold the bag pack together.

In FIG. 16 aligned bag pack 350 has aligned upper bag mouth edges 352 with a series of compression points 354, 356 and 358 extending slightly above bag mouth edges 352. Compression points 354, 356 and 358 serve to provide the second force and releasably bond bag pack 350 together in much the same manner as the bag pack of FIG. 8. These compression points 354, 356 and 358 where made by the same die cutting operation that forms the bag mouth edges 352. Compression points 354, 356 and 358 may be made by nothing more than having small upwardly pointed tits in the die blade, which tits tend to compress the immediately adjacent film walls together, thereby releasably bonding the bag pack together. These compression points may also be accomplished by having small upwardly pointed tits on the die blade, which tits have been slightly blunted. It may also be accomplished by having small upwardly pointed tits on the die blade and within the upwardly pointed tits are adjacent blunted rods compressing the bag walls adjacent the bag mouth together. The advantage to this method is the ability of having multiple bonding points thereby improving the self-opening phenomena. This means may be applied to just about any of the preceding examples, whether it be gusseted or flat merchandise bags or handled grocery sacks. This method of applying compression points can be effectively applied to die-cut handle cut-out edges and also produce a releasable bond.

Figure 17:
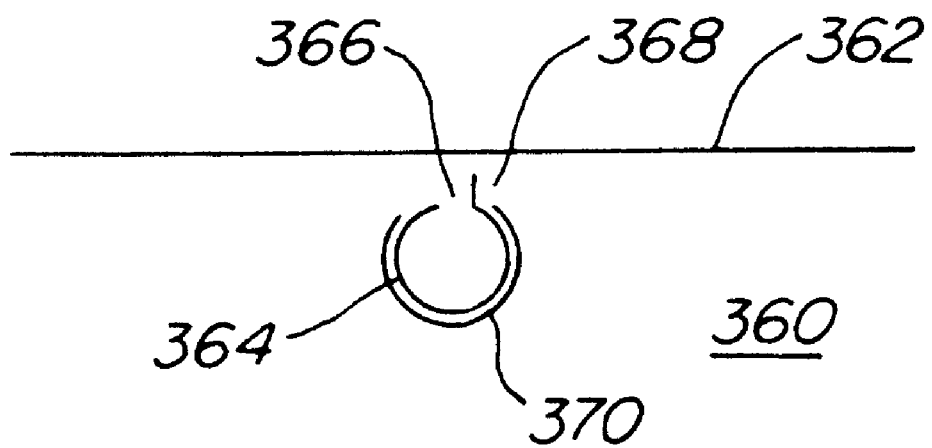
FIG. 17 is a partial plan view of the aligned bag mouths of a bag pack, which illustrates the use of the slit-like apertures in FIG. 15, whereas the slit-like aperture is adjacent the bag mouths.

In FIG. 17 aligned bag pack 360 has aligned upper bag mouth edges 362 with aligned apertures 364 like that of FIG. 15 located immediately below and adjacent bag mouth edges 364. These apertures remain connected at location 366 and have aligned ends 368 which lie about 1/16" from bag mouth edges 362 thereby causing a pre-weakened point. These apertures 364 are also made by a die punch with an external bevel just like those of FIG. 15, which bevel has formed a circular compression area 370 (shade lines) outside apertures 364, which compression area runs through the entire stack of bags and thereby releasably and selectively bonding together the bags in the bag pack. Having apertures 364 below and adjacent the aligned bag mouths 362, performs in substantially the same manner as the bags and apertures in the preceding FIGS. 1, 2, 3, 4, 5, 11, 12, 13, 14 and 15. The use of self-bonding apertures 364 serve the dual purpose of selectively and releasably bonding bags together into bag packs and forming pre-weakened release points for easy dispensing. They may be used in extended portions above a bag mouths or below and/or adjacent the bag mouths. The apertures may or may not be round such as the illustration, but may be a single straight slit such as that of FIG. 14. The result is substantially the same—bags which are releasably bonded together into a bag pack in which the bags will reliably dispense one-at-a-time and will self-open the next bag in sequence, such as has been illustrated throughout the previous illustrations.

From the foregoing descriptions and process and the many applications of using cold seals in plastic film and their extended portions and flanges in order to create self-opening bag packs which easily dispense, it will be appreciated that there would be several variations on this theme which would fall under the scope of the inventive matter. It is not the intention of the present invention to be limited solely to the film products illustrated herein, but to be used in whatever conceivable manner to improve the handling and the ease of opening a plastic bag, pouch or envelope-like product.

It should also be appreciated that the means of releasably bonding via cold seals or adhesion may be accomplished in many other manners. The intention of this application is not to limit the means of producing cold seals, but is to show how these seals when properly applied with releasable portions, can a high productively bag pack.

Furthermore, while the present invention refers to cold seals and adhesion of plastic film products, bags, pouches and so on, it should be understood that the same cold seal phenomena occurs when applied to a multitude of related film products such as laminates, foils and blends. For instance, popcorn bags typically made of laminated plastic and paper sheets would readily receive cold seals. Pouches made from co-extruded film (some of which are foil laminates), commonly used for foods and liquids, with nylon middle layers and polyethylene inner layers would also receive cold seals effectively. Even fertilizer or rock salt bags can be made to self-open in the filling process by using the technology of the present invention.

What is claimed is:

1. A process of serially dispensing and opening a bag from a bundle of bags lacking discrete tags for bag support comprising the steps of:
    providing a bundle of bags having at least a leading bag and a plurality of trailing bags with each bag of the bundle of bags having;
    a front bag wall having a top, a bottom, and two parallel side edges;
    a rear bag wall having a top, a bottom, and two parallel side edges;
    two bag sides, each bag side joining one of the side edges of the front bag wall to one of the side edges of the rear bag wall to form a closed continuum around the front bag wall and the rear bag wall;
    a bottom joining the bottom of the front bag wall and the bottom of the rear bag wall to form a closed bottom to the closed continuum of the bag;
    cutting the bundle of bags to define;
    at least one front support handle fastened to the front bag wall;
    at least one rear support handle fastened to the rear bag wall;
    a top to the bag which can be opened to receive articles within the bag;
    providing a bond adjacent the top of the rear bag wall of a leading bag joined to the top of the front bag wall of a trailing bag, the fastening releasing under a second force;
    providing at least one support for the front support handle and the rear support handle;
    threading the front support handle and the rear support handle to the bags in the bag bundle to the support;
    pulling on the front bag wall of the leading bag to release the front support handle of the leading bag from the support;
    continuing pulling on the front bag wall of the leading bag to release the rear support handle of the leading bag and the front support handle of the trailing bag from the support whereby the rear support handle of the leading bag pulls on the front support handle of the trailing bag to release both the rear support handle of the leading bag and the front support handle of the trailing bag from the support;
    continuing pulling on the front bag wall of the leading bag whereby the force attaching the rear bag wall of the leading bag to the front bag wall of the trailing bag is exceeded to cause separation of the leading bag from the trailing bag in a bag open disposition.

2. The process of serially dispensing and opening a bag from a bundle of bags according to claim 1 comprising the further steps of:
    providing the front bag wall and the rear bag wall with a low coefficient of friction interior and a high coefficient of friction exterior.

3. The process of serially dispensing and opening a bag from a bundle of bags according to claim 1 comprising the further steps of:

cutting the bundle of bags to form a releasable bond between the top of the rear bag wall of a leading bag joined to the top of the front bag wall of a trailing bag, the releasable bond releasing under a force.

4. A tab for mounting a bag bundle on a retaining hook of the type having two supporting side-by-side parallel lines terminating in an upwardly bent hook, the tab mounting comprising:

a bundle of bags having at least a leading bag and a plurality of trailing bags with each bag of the bundle of bags having;

a front bag wall having a top, a bottom, and two parallel side edges;

a rear bag wall having a top, a bottom, and two parallel side edges;

two bag sides, each bag side joining one of the side edges of the front bag wall to one of the side edges of the rear bag wall to form a closed continuum around the front bag wall and the rear bag wall;

a bottom joining the bottom of the front bag wall and the bottom of the rear bag wall to form a closed bottom to the closed continuum of the bag;

at least one tab attached to one bag wall of each bag in alignment with like tabs from like bag walls, the tab including:

a flanged aperture including at least one peak;

the at least one peak protruding inwardly toward and to the aperture for contact with the parallel lines whereby the tabs are bent out of alignment with the upwardly shaped hook at the end of the lines.

5. The tab for mounting a bag bundle on a retaining hook according to claim 4 and wherein:

the flanged aperture is generally triangular shaped and is cut between the apex and the two lower extremities and folded along the bottom edge between the two lower extremities.

6. The tab for mounting a bag bundle on a retaining hook according to claim 4 including a slit partially severing the tab overlying the triangular shaped aperture.

7. A bundle of bags having at least a leading bag and a plurality of trailing bags with each bag of the bundle of bags lacking discrete tags for bag support and having;

a front bag wall having a top, a bottom, and two parallel side edges;

a rear bag wall having a top, a bottom, and two parallel side edges;

two bag sides, each bag side joining one of the side edges of the front bag wall to one of the side edges of the rear bag wall to form a closed continuum around the front bag wall and the rear bag wall;

a bottom joining the bottom of the front bag wall and the bottom of the rear bag wall to form a closed bottom to the closed continuum of the bag;

the bundle of bags cut to form a releasable bond between the top of the rear bag wall of a leading bag joined to the top of the front bag wall of a trailing bag, the releasable bond releasing under a force, the cut further defining;

at least one front support handle fastened to the front bag wall;

at least one rear support handle fastened to the rear bag wall, a top to the bag which can be opened to receive articles within the bag whereby the bags are fastened in a bundle at the bag cut.

* * * * *